(12) United States Patent
Ouimet et al.

(10) Patent No.: US 7,580,852 B2
(45) Date of Patent: Aug. 25, 2009

(54) SYSTEM AND METHOD FOR MODELING NON-STATIONARY TIME SERIES USING A NON-PARAMETRIC DEMAND PROFILE

(75) Inventors: Kenneth J. Ouimet, Scottsdale, AZ (US); Denis Malov, Scottsdale, AZ (US)

(73) Assignee: SAP AG, Walldorf (DE)

( * ) Notice: Subject to any disclaimer, the term of this patent is extended or adjusted under 35 U.S.C. 154(b) by 766 days.

(21) Appl. No.: 11/064,874

(22) Filed: Feb. 23, 2005

(65) Prior Publication Data
US 2005/0234718 A1 Oct. 20, 2005

Related U.S. Application Data

(60) Provisional application No. 60/562,726, filed on Apr. 15, 2004.

(51) Int. Cl.
*G06F 17/30* (2006.01)
(52) U.S. Cl. .......................................... 705/10; 705/35
(58) Field of Classification Search ..................... 705/7, 705/8, 9, 10
See application file for complete search history.

(56) References Cited

U.S. PATENT DOCUMENTS

| | | | | |
|---|---|---|---|---|
| 5,488,561 A * | 1/1996 | Berkowitz et al. | ............ | 700/45 |
| 5,521,814 A * | 5/1996 | Teran et al. | ................. | 700/266 |
| 5,592,376 A * | 1/1997 | Hodroff | ....................... | 705/14 |
| 5,956,702 A * | 9/1999 | Matsuoka et al. | ............. | 706/22 |
| 6,321,212 B1 * | 11/2001 | Lange | ...................... | 705/36 R |
| 6,735,541 B2 * | 5/2004 | Kern et al. | .................... | 702/84 |
| 6,938,843 B2 * | 9/2005 | Johansson | .................... | 241/21 |
| 7,099,836 B2 * | 8/2006 | Cichanowicz | ................ | 705/26 |
| 7,225,153 B2 * | 5/2007 | Lange | ......................... | 705/37 |
| 7,269,569 B2 * | 9/2007 | Spira et al. | ..................... | 705/7 |
| 2001/0032029 A1 * | 10/2001 | Kauffman | .................... | 700/99 |
| 2002/0019803 A1 * | 2/2002 | Muller | ........................ | 705/38 |
| 2002/0161677 A1 * | 10/2002 | Zumbach et al. | ............. | 705/35 |

(Continued)

OTHER PUBLICATIONS

"Singular vectors, metrics, and adaptive observations" T N Palmer, R Gelaro, J Barkmeijer, R Buizza. Journal of the Atmospheric Sciences. Boston: Feb. 15, 1998. vol. 55, Iss. 4; p. 633, 21 pgs.*

(Continued)

*Primary Examiner*—Gurkanwaljit Singh
(74) *Attorney, Agent, or Firm*—Patent Law Office of Robert D. Atkins, P.C.

(57) ABSTRACT

A non-stationary time series model using a likelihood function as a function of input data, base demand parameters, and time dependent parameter. The likelihood function may represent any statistical distribution. The likelihood function uses a prior probability distribution to provide information external to the input data and is used to control the model. In one embodiment the prior is a function of adjacent time periods of the demand profile. The base demand parameters and time dependent parameter are solved using a multi-diagonal band matrix. The solution of base demand parameters and time dependent parameter involves making estimates thereof in an iterative manner until the base demand parameters and time dependent parameter each converge. A non-stationary time series model is provided from an expression using the solution of the base demand parameters and time dependent parameter. The non-stationary time series model provides a demand forecast as a function of time.

20 Claims, 7 Drawing Sheets

U.S. PATENT DOCUMENTS

| | | | |
|---|---|---|---|
| 2003/0014379 A1* | 1/2003 | Saias et al. | 706/45 |
| 2003/0149648 A1* | 8/2003 | Olsen et al. | 705/35 |
| 2004/0024606 A1* | 2/2004 | Chukwu | 705/1 |
| 2004/0083152 A1* | 4/2004 | Markov et al. | 705/36 |
| 2004/0133403 A1* | 7/2004 | Boedi et al. | 702/189 |
| 2004/0243462 A1* | 12/2004 | Stier | 705/11 |
| 2006/0116920 A1* | 6/2006 | Shan | 705/10 |

OTHER PUBLICATIONS

Y. Luo and J.A. Chambers "Fast Convergence Algorithms for Joint Equalization and Source Separation Based Upon Cross-Correlation and Constant Modulus Criterion" IEEE (2002).*

T.R. Prabhakar, Aruna Srivastav and R.C. Tomar "Inverse of a Tridiagonal Band Matrix in Terms of Generalized Hermite Polynomials" Indian J. pure appl. Math., (Oct. 1979) 10(10): 1284-1287.*

Andreas Griewank "A mathematical view of automatic differentiation" Acta Numerica (Cambridge University Press, 2003), pp. 321-398.*

Ben Cooper "The analysis of hospital infection data using hidden Markov models" Biostatistics; Apr. 2004; 5, 2; Research Library p. 223.*

Inverse of a Tridiagonal Band Matrix in Terms of Generalized Hermite Polynomials T. R. Prabhakaarr, Unas Rivastavaan D R. C. Toma Indian J.pure appl. Math., IO(10): 1284-1287, Oct. 1979.*

Singular vectors, metrics, and adaptive observations T N Palmer, R Gelaro, J Barkmeijer, R Buizza. Journal of the Atmospheric Sciences. Boston: Feb. 15, 1998. vol. 55, Iss. 4; p. 633, 21 pgs.*

Time-Series Econometrics: Cointegration and Autoregressive Conditional Heteroskedasticity, The Royal Swedish Academy of Sciences, pp. 1-31, 1983.

* cited by examiner

SYSTEM AND METHOD FOR MODELING NON-STATIONARY TIME SERIES USING A NON-PARAMETRIC DEMAND PROFILE

CLAIM TO DOMESTIC PRIORITY

The present non-provisional patent application claims priority to provisional application Ser. No. 60/562,726 entitled "System and Method for Modeling Non-Stationary Time Series Using a Non-Parametric Demand Profile", filed on Apr. 15, 2004, by Ouimet et al.

FIELD OF THE INVENTION

The present invention relates in general to economic modeling and, more particularly, to a system and method for modeling non-stationary time series data using a non-parametric demand profile.

BACKGROUND OF THE INVENTION

Economic and financial modeling and planning is commonly used to estimate or predict the performance and outcome of real systems, given specific proposed sets of input data. An economic-based system will have many variables and influences which determine its behavior. A model is a mathematical expression or representation which predicts the outcome or behavior of the system under a variety of conditions. In one sense, it is relatively easy, in the past tense, to review historical data, understand its past performance, and state with relative certainty that the system's past behavior was influenced by the historical data. A much more difficult task, but one that is extremely valuable, is to generate a mathematical model of the system which predicts how the system will behave with a different set of data and assumptions. While foreseeing different outcomes with different sets of input data is inherently imprecise, i.e., no model can achieve 100% certainty, the field of probability and statistics has provided many tools which allow such predictions to be made with reasonable certainty and acceptable levels of confidence.

In its basic form, the economic model can be viewed as a predicted or anticipated outcome, as driven by a given set of input data and assumptions. The input data is processed through a mathematical expression representing either the expected or current behavior of the real system. The mathematical expression is formulated or derived from principals of probability and statistics, often by analyzing historical data and corresponding known outcomes, to achieve a best fit of the expected behavior of the system to other sets of data. In other words, the model should be able to predict the outcome or response of the system to a specific set of data being considered or proposed, within a given level of confidence, or an acceptable level of uncertainty. As a simple test of the quality of the model, if historical data is processed through the model and the outcome of the model, using the historical data, is closely aligned with the known historical outcome, then the model is considered to have a high confidence level over the interval. The model should then do a good job of predicting outcomes of the system to different sets of input data.

Most, if not all, modeling in statistics and economics is based on an assumption, that the underlying process is stationary and doesn't change with time. Unfortunately, most processes of commercial interest do change with time, i.e., non-stationary. The time dependency poses a challenge for researchers in statistics and economics.

Practitioners often times use ad-hoc methods to address the problem of non-stationary processes. For example, in the retail industry it is common to develop a category seasonality index from historical sales. The index is then used to "de-seasonalize" the sales. The category seasonality index approach is not a rigorous method and runs into many problems. There are two major drawbacks to this method: 1) often times products have unique demand profiles that are not in sync with the overall categories demand, and 2) causal factors like promotional and pricing activity can be absorbed into the seasonality index. Both of these factors can lead to biased parameter estimates. It is not uncommon for this method to lead to price elasticities with the wrong sign.

Consider the application of economic modeling to retail merchandising. In most segments of the industry, there is an inverse relationship between the price of goods or services and volume or unit sales. As a general proposition, as price increases, unit sales decrease, and as price decreases, unit sales increase. However, ascertaining the relative magnitudes of the opposing movements, as well as evaluating various other factors influencing the basic parameters of price and sales, often requires sophisticated modeling tools.

Most commercially-useful economic models use highly complex algorithms and take into account many different factors and parameters to compute the predicted outcome. One such economic model is described in Kungl. Vetenskapsakademien, The Royal Swedish Academy of Sciences, Stockholm, Sweden, entitled "Time-Series Econometrics: Cointegration and Autoregressive Conditional Heteroskedasticity" by Robert Engle and Clive Granger, which describes macroeconomic and financial economic models in terms of nonstationarity and time-varying volatility over a time series. Engle and Granger received the 2003 Nobel Prize for their work on modeling non-stationary processes. Granger is credited with co-integration which is a method for modeling the difference of two time series that have the same underlying non-stationary process. If the model is linear then the non-stationary process cancels out and the system can be accurately modeled. Engle is credited with the autoregressive conditional heteroskedasticity (ARCH) process which is a method for accounting for the variance or volatility of the time series.

While these methods have provided a tool for modeling macro-economic systems they are not very extensible to micro-economic systems. In micro-economic systems, the assumption of a Gaussian distribution breaks down and more complicated "non-linear" likelihood functions must be deployed, which is a problem for both methods listed above.

For purposes of the present illustration, a simplified model of price and unit sales is considered. FIG. 1 illustrates basic time series plots of price versus time and unit sales versus time. The time series plots illustrate a particular category or grouping of related goods or services. In FIG. 1, from time $t_0$ to time $t_1$, the price is $12 as shown by trace 12. From time $t_0$ to time $t_1$, the predicted unit sales, as shown by trace 14, is steady at 1000 units. At time $t_1$, trace 12 (price), drops from $12 to $9. As a result of market forces associated with the price reduction, the model predicts that trace 14 (unit sales) will rise from 1000 to 2000 units. At time $t_2$, trace 12 (price) goes back to $12 and trace 14 (unit sales) returns to 1000 units. The simplified model receives price as input data and predicts how the unit sales will follow, i.e., how unit sales are affected by different prices, or what pricing levels will achieve desired goals of unit sales.

The standard model uses parametric measures having a known or given statistical distribution for the category as a whole. The prediction algorithm may be as simple as an average of sales across each time period, or it may use more complex functions. For example, the model of unit sales (US) as function of price (P), may be given as expressed in equation (1):

$$US(P)=Ae^{-\beta P} \qquad (1)$$

The base demand parameters of the above Gaussian distribution are A and β and the parametric model assumes that unit sales or demand follows that distribution as a function of price across the entire time series.

It is common practice for standard parametric modeling techniques to first de-seasonalize the sales data at a category level. The category level is a grouping of related products, e.g., 1000 different products in the staple foods, or health and beauty aids, or home improvement products. The data is filtered or adjusted to remove such factors as seasonal variation, e.g., holiday, summer, winter sales, across the category as a whole. Once de-seasonalized, the standard parametric model assumes that the demand is flat, i.e., that only price and promotion (merchandising and marketing) remain to affect demand. A flat demand presumes that there are no other material factors influencing demand.

However, in real economic systems, such as retail merchandising, the presumption of a flat demand, even after de-seasonalizing the category data, is often invalid or inaccurate and can lead to biased parameter estimates. In many cases, variation in demand of specific products within the category over time will influence the category-level demand response. Yet, in parametric modeling, demand-related factors are not modeled at the product level and, as such, do not take into account such time-varying factors. Even though the demand has been adjusted for seasonality at the category level, other time dependent factors which occur at the product level may still affect demand. These time dependent product-level factors, which are not taken into account in standard parametric modeling, include factors such as product introduction or product discontinuation.

The introduction of new products and/or discontinuation of existing products can have material impact on category-level demand, either in the positive or negative direction. If the new product is hot or en vogue from some event or need, demand may be sky high in its own right, separate and apart from the price or promotional efforts. If the new product is unknown or yet to be accepted, demand may need to ramp up over time, especially if the new product faces stiff competition. Product discontinuation may cause consumers to shy away if the product is perceived as out-dated, or consumers may stockpile the discontinued product for fear of no suitable replacement.

Another time dependent product-level factor involves products within a category that have different seasonal response than the category as a whole. If the seasonal demand for a given category of products goes down, but one or more products within that category experiences an increase in demand during the same season, or vice versa, then the parametric model goes astray. For example, in the fall, the category of fresh produce in retail food stores may decline because of the end of the growing season. However, come the end of October, sales of pumpkins and apples have the opposite seasonal demand response, i.e., Halloween is prime-time for pumpkins.

Since parametric modeling does not account for such time dependent product-level factors, which may have a material impact on category-level demand, the resulting parametric model loses its ability to model outcomes with high confidence. The parametric-derived demand profile curve does not fit the historical data and does not necessarily predict demand profiles and parameters with reasonable certainty. The measure of price elasticity, which indicates how unit sales respond to price change, becomes distorted, i.e., price elasticity may be too high or too low, and may even register as negative in certain scenarios, which makes no sense. While it is possible to manually adjust or tune parametric models to compensate for such time dependent product-level factors which influence demand, the tuning exercise is time consuming and impractical in many situations. Most users of economic models do not favor any model that requires continuous tweaking to get reasonable predictions. The manual tuning effort multiplies when one considers the many different products, locations, and venues which may be involved.

A need exists to accurately model time dependent parameters within a likelihood function.

SUMMARY OF THE INVENTION

The current invention models the non-stationary process directly using a Bayesian framework. It uses a non-parametric demand profile to model the non-stationary process. The term non-parametric refers to the fact that the profile doesn't have any pre-conceived structure or shape and can handle any process. The modeling of the non-stationary process is integrated directly into the likelihood function, which allows it to easily handle any likelihood function. The modeling process uses a Bayesian framework, which allows information in the form of a prior to be provided to the model. The invention provides a method for modeling non-stationary micro systems as well as non-stationary macro-economic systems.

In one embodiment, the present invention is a method of modeling non-stationary time series data, comprising providing a likelihood function as a function of input data, base demand parameters, and time-varying parameter, wherein the likelihood function includes a control parameter as a function of multiple time periods of the time-varying parameter, solving for the base demand parameters and time-varying parameter, and providing a non-stationary time series model from an expression using the solution of the base demand parameters and time varying parameter.

In another embodiment, the present invention is a method of using a non-stationary time series model comprising providing a likelihood function as a function of input data, base demand parameter, and time dependent parameter, solving for the base demand parameter and time dependent parameter, and providing a non-stationary time series model from an expression using the solution of the base demand parameter and time dependent parameter.

In yet another embodiment, the present invention is a method of providing a non-stationary time series model comprising providing a likelihood function as a function of input data and a time dependent variance, and providing the non-stationary time series model from an expression using the time dependent variance.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool which allows companies to conduct business planning, forecast demand, model revenue, optimize price, and optimize profit. Economic modeling is applicable to many businesses such as manufacturing, distribution, retail, medicine, chemicals, financial markets, investing, wealth-consumption relationships, exchange rates, inflation rates, pricing of options, value of risk, research and development, forecasting public service information such as number of traffic accidents for a hospital, and the like. In the face of mounting competition and high expectations from investors, most if not all businesses must look for every advantage they can muster in maximizing market share and profits. The ability to forecast demand, in view of pricing options, and to consider other factors which materially affect overall revenue and profitability is vital to the success of the bottom line, and the fundamental need to not only survive but to prosper and grow.

In particular, economic modeling is essential to businesses which face thin profit margins, such as retail food outlets and general consumer merchandise. One well-recognized axiom states that "[o]n average, a 1% increase in price, without corresponding drop in volume, can lead to operating profit improvements of 11% or greater." Clearly, many businesses are keenly interested in economic modeling and forecasting, particularly when the model provides a high degree of accuracy or confidence, and takes into account time dependent factors which influence demand down to the product or SKU level.

Figure 1:
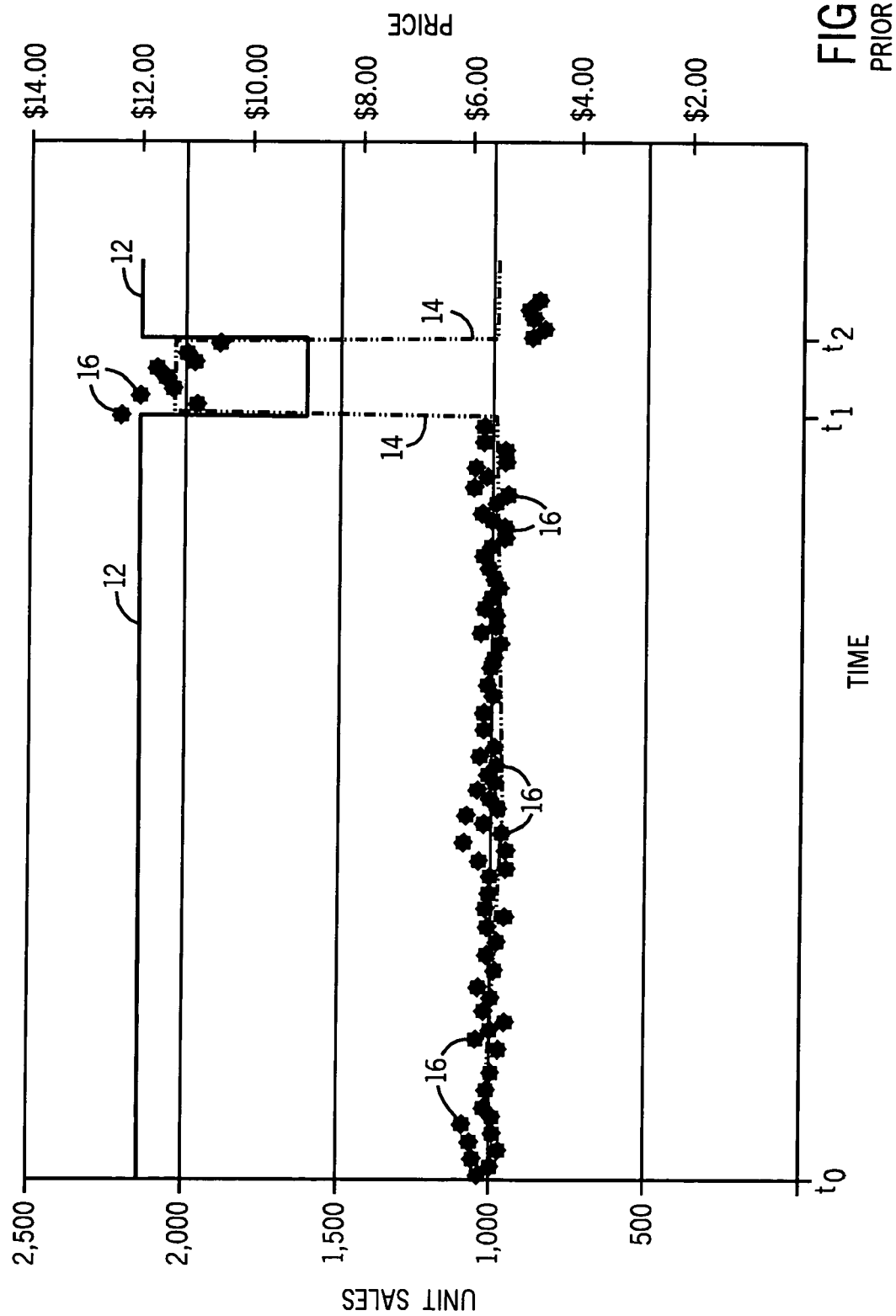
FIG. 1 is a time series plot using known parametric modeling.
Figure 2:
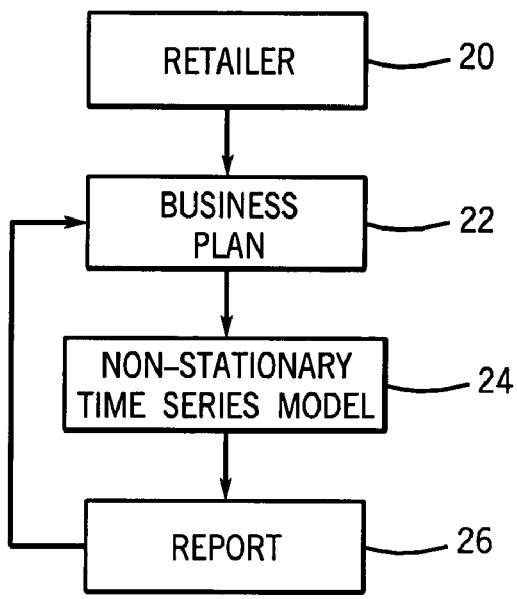
FIG. 2 illustrates a retailer using non-stationary time series modeling in its business planning.

The present discussion will consider economic modeling as applied to retail merchandising. In FIG. 2, retail outlet (retailer) 20 has certain product lines or services available to customers as part of its business plan. Retailer 20 may be a food store chain, general consumer product retailer, drug store, discount warehouse, department store, specialty store, service provider, etc. Retailer 20 has the ability to set pricing, order inventory, run promotions, collect and maintain historical sales data, and adjust its strategic business plan. The management team of retailer 20 is held accountable for market share, profits, and overall success and growth of the business. While the present discussion will center around retailer 20, it is understood that the non-stationary time series model described herein is applicable to other industries and businesses having similar goals, constraints, and needs.

Retailer 20 has a business plan 22. Business plan 22 includes many planning, analyzing, and decision-making steps and operations. Business plan 22 gives retailer 20 the ability to evaluate performance and trends, set pricing, order inventory, run promotions, hire employees, expand stores, add and remove product lines, organize product shelving and displays, select signage, and the like. Business plan 22 allows retailer 20 to analyze data, evaluate alternatives, run forecasts, and make operational decisions. In order to execute on business plan 22, the management team needs accurate model parameters. From business plan 22, retailer 20 provides certain input data and assumptions, and requests specific forecasts and predictions from non-stationary time series model 24, which in turn performs a series of complex calculations and mathematical modeling operations to predict and forecast the business parameters or models in which retailer 20 is most interested. The output of non-stationary time series model 24 is a report, chart, or other analysis 26 of the model's forecasts and predictions based on the model parameters, for the given set of input data and assumptions. Report 26 can be used by retailer 20 to make price optimization decisions in accordance with forecasted sales. In general, report 26 gives retailer 20 the forecast information necessary to set pricing, forecast demand, order inventory to meet such anticipated demand, and adjust its strategic planning and thinking process, all with the purpose and intention of maximizing market share, revenue, and profits. While the business' strategy is formulated at enterprise level, the execution of that strategy must occur at the product or category level. Accordingly, non-stationary time series model 24 is one tool used by the management team of retailer 20 to execute their strategy for the business.

In the present discussion, non-stationary time series model 24 is applied to the common problem of setting price in view of demand or unit sales. Retailer 20 may understand that demand usually changes in opposition to price, but determining the relative magnitudes of such opposing movements as a function of time, and further to take into account other time-varying demand-influencing factors, is much more difficult.

Figure 3:
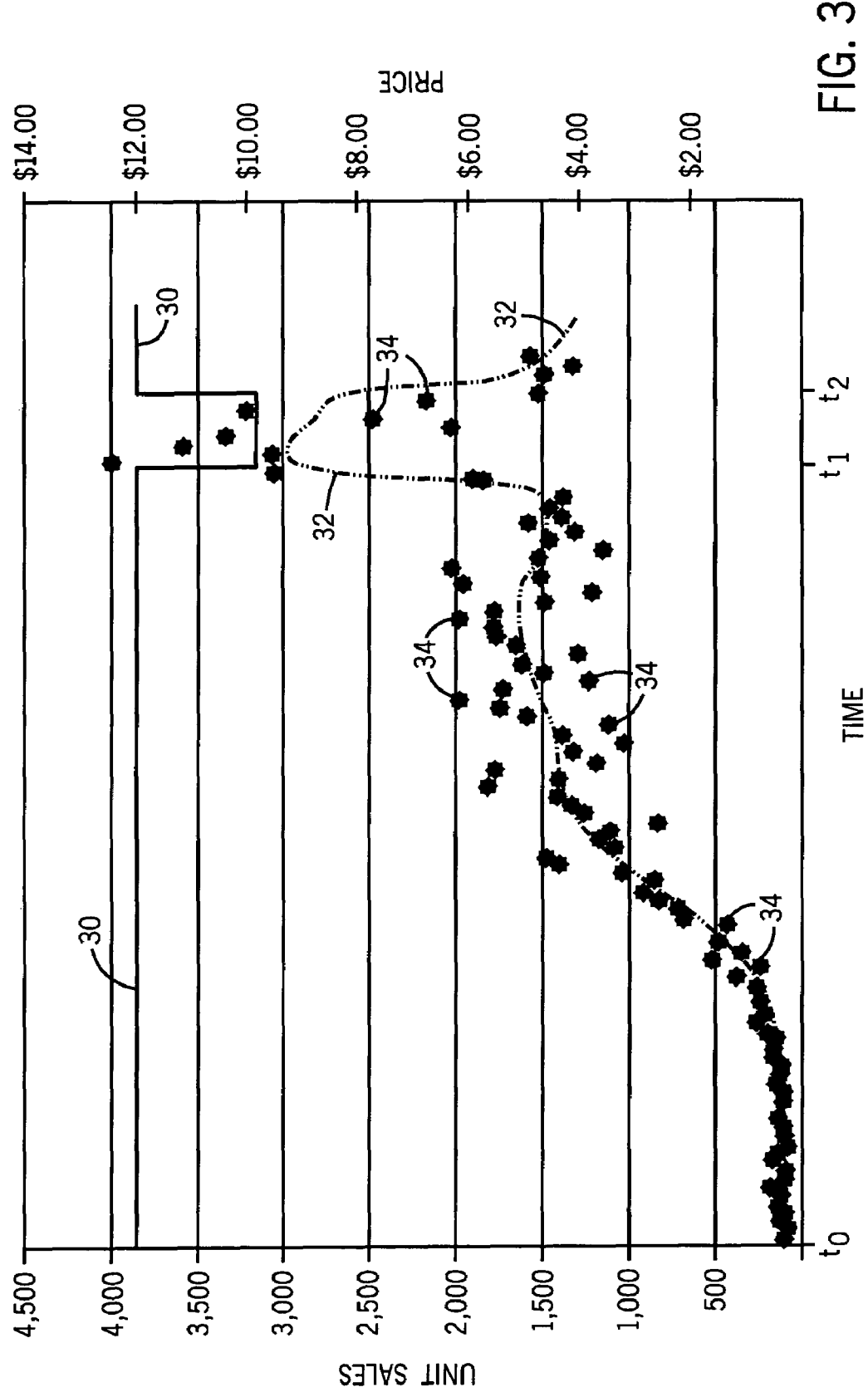
FIG. 3 is a time series plot involving the case of new product introduction which influences demand.

FIG. 3 illustrates relatively slow-changing time series plots of price versus time and unit sales versus time. The time series plots illustrate new product(s) of the subject category that are being introduced into the stores of retailer 20. It is common for retailer 20 to introduce new products in its stores. The time series plots illustrate a combination of historical data, input data, and forecasted demand, as determined by non-stationary time series model 24.

In FIG. 3, price is shown as trace 30. Price is an independent input variable. That is, retailer 20 may request a forecast in the form of "what happens to demand if the price is set anywhere between a minimum price ($P_{min}$) and a maximum price ($P_{max}$)?" Given a price $P_i$, where $P_{min} \leq P_i \leq P_{max}$, non-stationary time series model 24 predicts or forecasts the corresponding unit sales or demand. The forecast takes into account time dependent product-level factors such as product introduction, product discontinuation, and product seasonal response being different from category seasonal response.

Trace 32 is the predicted or forecasted unit sales or product demand as determined by non-stationary time series model 24, as described hereinafter. The forecasted demand takes into account time-varying product-level factors, which increases the confidence level of the prediction. Data points 34 represent historical data, which may not be present on an actual commercial report 26, but which are provided here to illustrate the accuracy or confidence level of the demand forecast made by non-stationary time series model 24.

In FIG. 3, from time $t_0$ to time $t_1$, the price is fixed at $12, as shown by trace 30. From time $t_0$ to time $t_1$, the forecasted or predicted unit sales, as shown by trace 32, ramps up over time from a small value to about 1500 unit sales per unit time period. In FIG. 3, the unit time scale is in weeks. The ramp-up in forecasted demand is driven in part by the time dependent product level factor of new product introduction, and substantially follows the actual historical data points 34.

At time $t_1$, trace 30 (price) drops from $12 to $9. According to trace 32, non-stationary time series model 24 predicts that unit sales rises to about 3000 units. At time $t_2$, trace 30 goes back to $12 and trace 32 (unit sales) falls back to prior levels.

After de-seasonalizing the sales, the model assumes it is a stationary process, i.e., flat demand. With respect to FIG. 3, in a parametric model, the forecasted demand may have been fixed or flat between time to $t_0$ to time $t_1$, as an average across the given price level. The flat demand model is not an accurate representation of the actual historical demand as seen by data points 34. If the average demand in the parametric model was say 600 units, then the demand curve would experience a large demand lift at time $t_1$, which is in fact not the case. The price elasticity from the parametric model becomes distorted, i.e., price elasticity is too high, and the confidence level over the interval falls. The change in demand for a given change in price, as predicted by the parametric model, did not in fact occur. The actual change in demand resulting from the change in price is much less.

The simplified non-stationary time series model 24 receives price as input data and predicts how the unit sales will follow, i.e., how unit sales are affected by different prices, or what pricing levels will achieve desired goals of unit sales. The non-stationary time series model accounts for time dependent product-level factors, which may have a material impact on demand. From the demand forecast of non-stationary time series model 24, trace 32 (predicted demand) substantially follows data points 34 (historical demand). The measure of price elasticity, i.e., ratio of percent change in unit sales or demand to percent change in price, is more accurate with non-stationary time series model 24. The demand change at time $t_1$ as seen from the non-stationary time series model can be attributed to the price change at time $t_1$.

Figure 4:
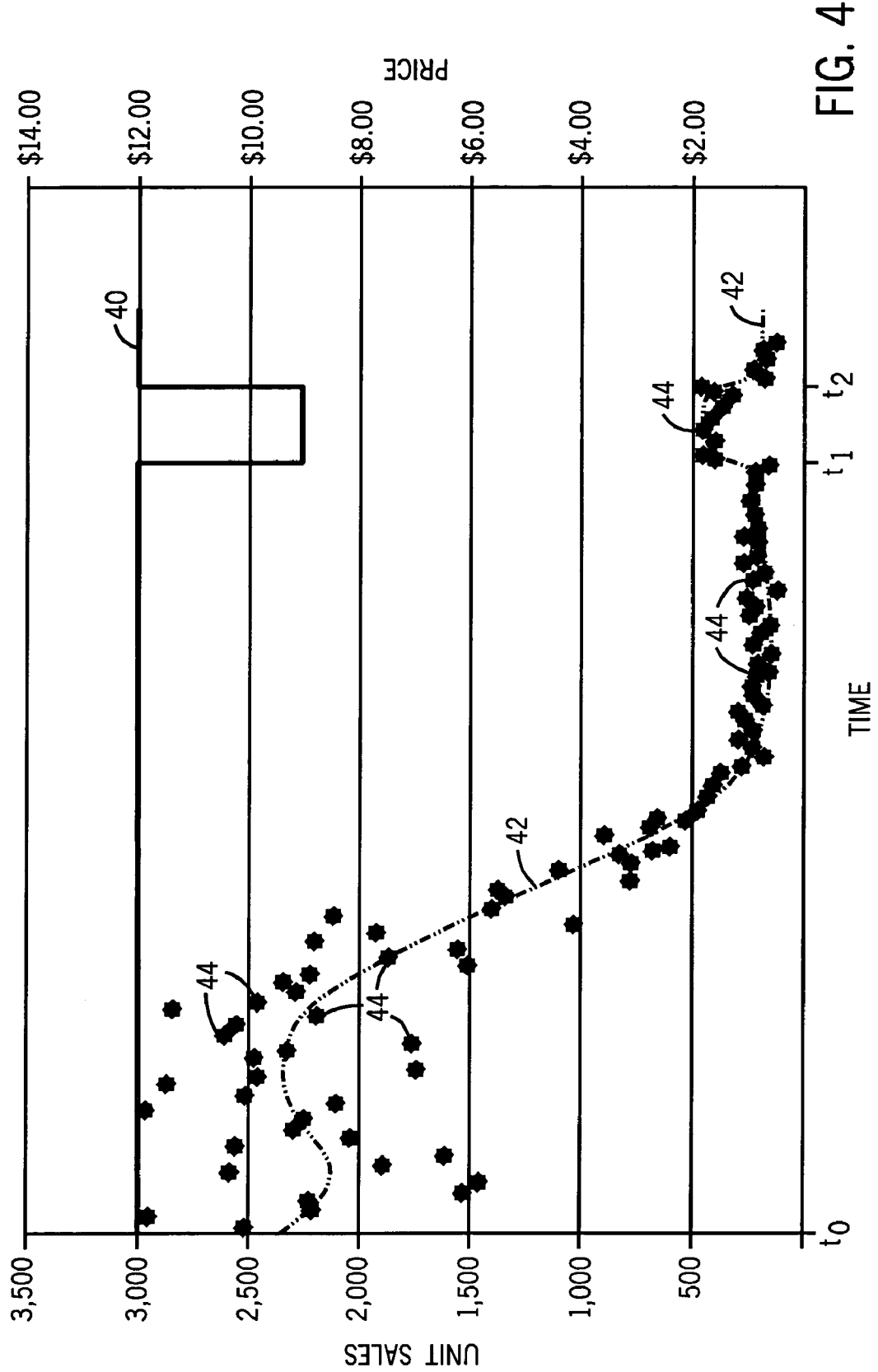
FIG. 4 is a time series plot involving the case of product discontinuation which influences demand.

Another product or category of products is modeled in FIG. 4. In this case, certain product(s) are being discontinued by retailer 20. Many retailers discontinue products on a regular basis, e.g., every 3 years, so this time dependent product-level factor is important to accurately model. In FIG. 4, price is shown as trace 40. Again, price is an independent input variable. Trace 42 is the predicted or forecasted unit sales or demand as determined by non-stationary time series model 24. Data points 44 represent historical data, which may not be present on an actual commercial report 26, but which are provided here to illustrate the accuracy or confidence level of non-stationary time series model 24.

In FIG. 4, from time $t_0$ to time $t_1$, the price is fixed at $12, as shown by trace 40. From time $t_0$ to time $t_1$, the forecasted or predicted unit sales, as shown by trace 42, generally ramps down over time from less than 2500 unit sales, to about 200 unit sales per unit time period. The ramp-down in forecasted demand is driven in part by the time dependent product-level factor of certain products within the category being discontinued, and substantially follows the actual historical data points 44. Data points 44 are widely scattered with significant variance, just after time $t_0$, but converge as the demand approaches time $t_1$.

At time $t_1$, trace 40 (price) drops from $12 to $9. According to trace 42, non-stationary time series model 24 forecasts unit sales to rise to about 400 units. At time $t_2$, trace 40 goes back to $12 and trace 42 (unit sales) falls back to 200 unit level.

With respect to FIG. 4, in a parametric model, the forecasted demand may have been fixed or flat between time $t_0$ to time $t_1$, as an average across the given price level. The flat forecasted demand is not an accurate representation of the actual historical demand as seen by data points 44. If the average demand in the parametric model was say 700 units, then the demand curve from the parametric model would predict a drop when the price dropped at time $t_1$. The price elasticity from the parametric model would be negative, i.e., the more the price falls, the more the demand falls, which is clearly erroneous.

Figure 5:
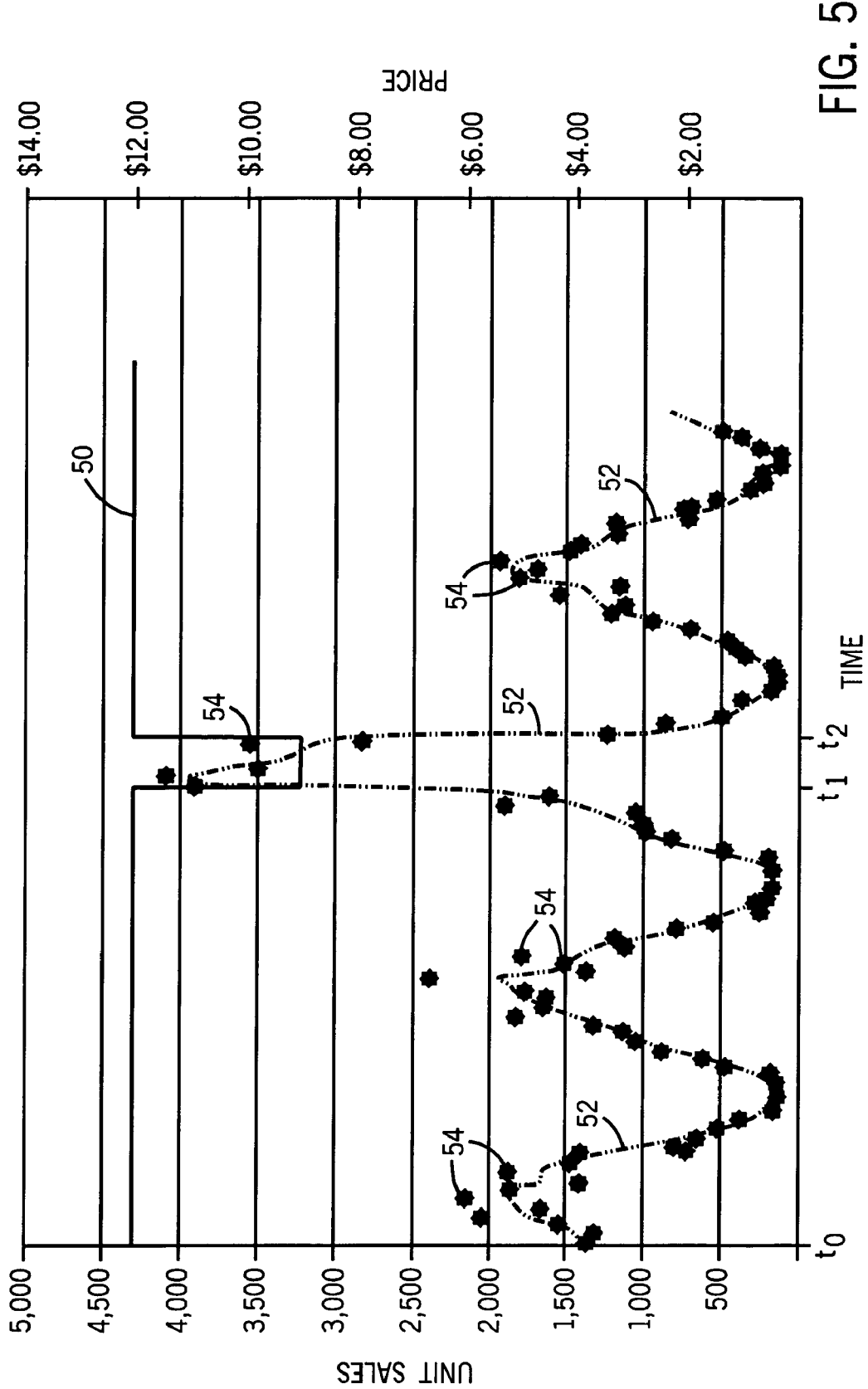
FIG. 5 is a time series plot involving the case of product seasonal response different from category seasonal response which influences demand.

Yet another time series is modeled in FIG. 5. In this case, the seasonal response of one or more products within the subject category is different from the seasonal response of the category as a whole. For example, the seasonal response for the category may involve a decrease in demand, while specific product(s) within the category experience an increase in demand for the same season, see fresh produce example in the background. Moreover, the effect from individual products within the category, opposing the general category demand trend, becomes even more involved as the seasonal product responses engage at different times and with different strengths in terms of rates of change and individual product unit sales as compared to the category as a whole.

In FIG. 5, price is shown as trace 50. Trace 52 is the predicted or forecasted unit sales or demand as determined by non-stationary time series model 24. Data points 54 represent historical data. From time $t_0$ to time $t_1$, the price is fixed at $12, as shown by trace 50. From time $t_0$ to time $t_1$, the forecasted or predicted unit sales, as shown by trace 52, increase and decrease over the time series between 200 units and 2000 units. At time $t_1$, trace 50 (price) drops from $12 to $9. According to trace 52, non-stationary time series model 24 forecasts unit sales to increase to about 3500-4000 units in response to the price decline. At time $t_2$, trace 50 goes back to $12 and trace 52 (unit sales) returns to its previous time varying behavior. The variation in forecasted demand is caused by different product(s) within the category kicking in their respective seasonal responses, in opposition to any seasonal demand response of the category as a whole. Trace 52 closely follows historical data points 54, which gives a high confidence over the interval.

With respect to FIG. 5, in a parametric model, the forecasted demand may have been fixed or flat between time $t_0$ to time $t_1$, as an average across the given price level. Again, the flat demand is not an accurate representation of the actual historical demand, as seen by data points 54. If the average demand in the parametric model was say 700 units, then the demand curve would experience a large demand lift at time $t_1$, which is in fact not the case. The price elasticity from the parametric model is distorted, i.e., again price elasticity is too high, and the confidence level over the interval falls.

Figure 6:
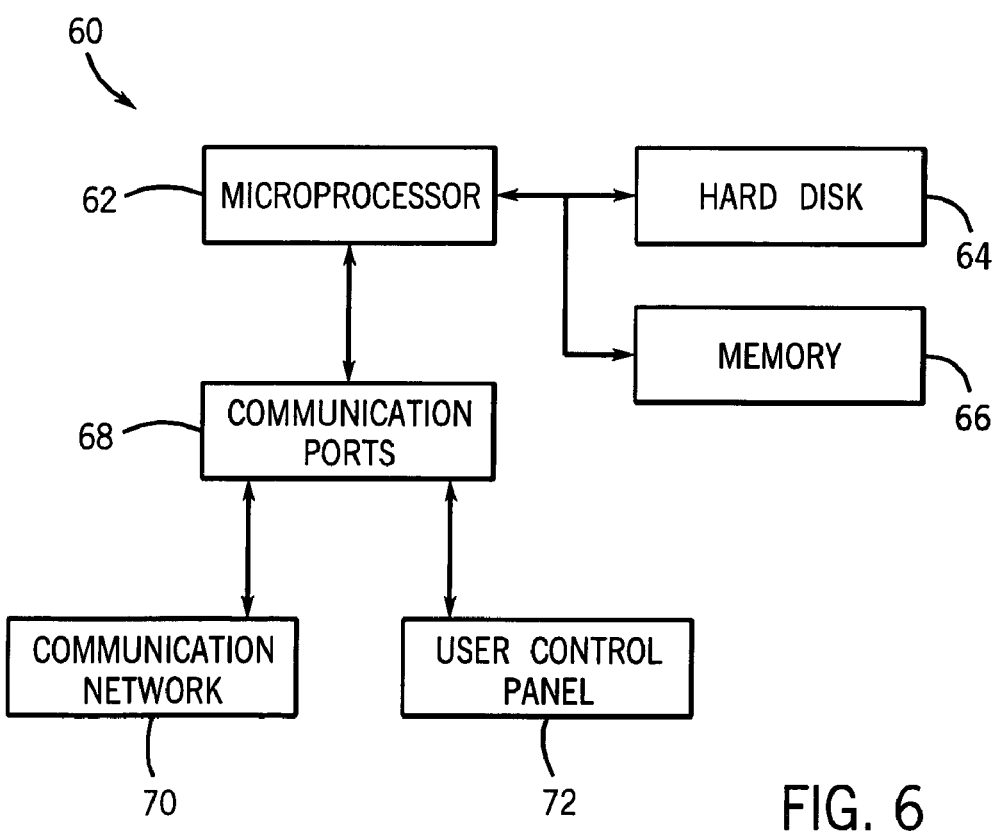
FIG. 6 is a computer system executing the non-stationary time series model.

Non-stationary time series model 24 is a tool available to retailer 20 to generate various forecasts used in retail merchandising as represented by report 26. Non-stationary time series model 24 is implemented with computer programs and application software executing on general purpose computer 60, as shown in FIG. 6. Computer 60 includes a central processing unit or microprocessor 62, mass storage device or hard disk 64, electronic memory 66, and communication ports 68. Communication ports 68 may include a high-speed Ethernet connection to a communication network 70. Communication network 70 is an open architecture system such as the World Wide Web, commonly known as the Internet. Hence, retailer 20 can access computer 60 remotely through communication network 70 to run the non-stationary time series model 24 and generate report 26. In one embodiment, non-stationary time series model 24 is accessed through a website contained on hard disk 64. Retailer 20 runs non-stationary time series model 24 and generates report 26 through the website. Alternatively, retailer 20 makes requests of a third party who in turn runs non-stationary time series model 24 and generates report 26 on behalf of retailer 20. The requests to generate report 26 may be made to the third party through the website or other communication medium.

In another embodiment, non-stationary time series model 24 runs on computer 60 which is located in facilities of retailer 20. Retailer 20 interacts with computer 60 through user control panel 72, which may take the form of a local computer terminal. Retailer 20 enters commands and selects modeling options by way of user control panel 72, which is connected to computer 60 through communication ports 68.

There are many factors which require unique time dependent product-level demand profiles. Fortunately, non-stationary time series model 24 has the ability to adjust itself to any time-varying demand profile. In the non-stationary time series model, the likelihood function can change or adapt for each unit period of the time series. In other words, non-stationary refers to the ability of the model to create a likelihood function, including different demand profile factors, for each time slice of the time interval. While the non-parametric demand profile is characterized with parameters, each time period can have a unique parameter. This allows the model's demand profile to adapt to any actual demand profile. By giving the likelihood function the ability to adapt, the non-stationary time series model can change from unit time period to unit time period and thereby take into account the product or SKU-level factors within the category, each as its own function of time dependent demand. For each unit period of the time series, there is a set of parameters which describe the attributes being modeled, e.g., price, promotion, and time dependent demand-influencing product-level factors. The set of parameters are updated on a unit time period basis which, by direct correlation, means the likelihood function over the time series is being adapted or updated from unit time period to unit time period.

A feature of the non-stationary time series model is to acquire estimates of the parameter values, e.g., price elasticity, promotional lift, and base demand parameters, which are not biased, for each time period of the time series. By acquiring good estimates of the modeling parameters, as a function of time, the overall performance and accuracy of the model and forecast improves. Non-stationary time series model 24 then provides a forecast or prediction of what might happen given certain proposed input data and the acquired good estimates of the modeling parameters.

Figure 7:
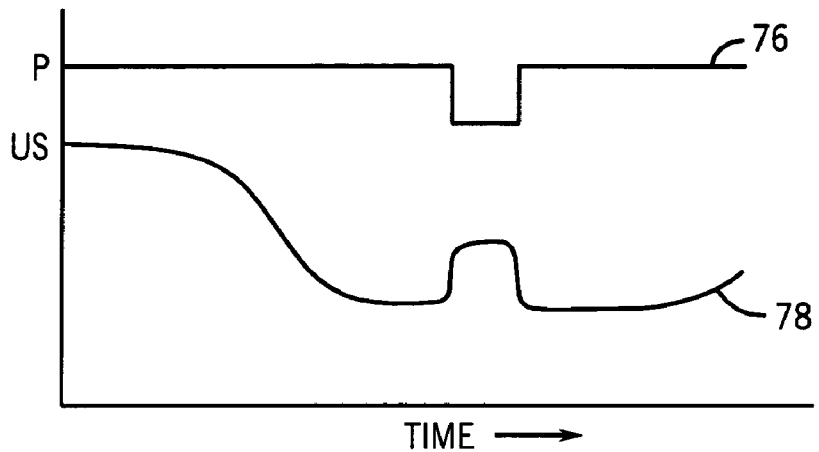
FIG. 7 is a plot of price and unit sales over time.

The non-stationary time series modeling process in the present discussion begins with historical data of the parameter(s) to be modeled. Again, for the purpose of illustration, the simplified parameters are historical price ($P_t$) and unit sales ($US_t$) as a function of time, i.e., over a time series. It is understood that non-stationary time series model 24 is capable of modeling other time varying or time dependent parameters, or spatial dependent parameters. Assume there are 100 time periods in the time series. At time $t_0$, price is $P_0$ and unit sales is $US_0$; at time $t_1$, price is $P_1$, and unit sales is $US_1$; at time $t_2$, price is $P_2$ and unit sales is $US_2$; and at time $t_{99}$, price is $P_{99}$ and unit sales is $US_{99}$. The price and unit sales may be graphed over time as shown in FIG. 7. Trace 76 is price and trace 78 is unit sales.

As discussed above, there are time dependent factors that are in fact influencing the demand curve, other than category-level seasonal adjustments. The non-stationary time series model takes into account such factors, including time dependent product or SKU-level factors, in generating the overall demand forecast or prediction. The product-level factor or demand profile ($f_t$) exist across the time series, each with its own time dependent demand, and may have different values at each unit time period. Demand profile $f_t$ may exhibit non-linear movement or transition from one unit time period to the next unit time period. Since demand profile $f_t$ is time dependent, there will be $f_0$ at time $t_0$, $f_1$ at time $t_1$, $f_2$ at time $t_2$, and so on through $f_{99}$ at time $t_{99}$.

In one embodiment, demand profile $f_t$ is a composite of time dependent product-level factors influencing the category. For example, demand profile $f_t$ may represent the fact that new products A and B are being introduced, products C and D are being discontinued, and products E and F do not follow the seasonal category demand response. In another embodiment, demand profile ft is a function of products A-F and time. In this case, the demand profile $f_t$ can be defined by a matrix with indices of products A-F and time. Products A-F are assigned to the rows of the matrix and time periods $t_i$ as the columns of the matrix. The demand profile matrix contains discrete data points of the per product influence of the demand profile $f_t$ as a function of time.

The statistical distribution relating the model to the observed data can take many different forms. In the present discussion, the statistical distribution will be considered more generally as a likelihood function. Time series for microeconomic systems frequently require modeling discrete non-negative values such as unit sales. In these cases, the common Gaussian likelihood function does not accurately describe the process and a Poisson or Negative Binomial distribution are commonly implemented. There are numerous likelihood functions and the proper likelihood function depends on the process being modeled.

In general, the different likelihood functions have a few attributes in common. First, the distribution has the ability to evaluate parameters as a function of time, i.e., $US_t$, $P_t$, and $f_t$, without predefined structure such as noted in equation (1). Second, the likelihood function should be capable of efficient computation. In long time series, the number of individual equations becomes unwieldy and requires certain computation efficiencies in order to allow the model to execute in a reasonable amount of time. Third, even through the likelihood function has many time dependent parameters, it should maintain available degrees of freedom.

Consider one such likelihood function, which is Gaussian in form, as shown in equation (2). The regression is one representation of the general likelihood function for a Gaussian distribution, and provides a mechanism to generate a best-fit continuous curve to individual, distributed data points, which is common for discrete time series data.

$$R^2(A, \beta, f_t) = \sum_t \left( US_t - A e^{-\beta P_t + f_t} \right)^2 \qquad (2)$$

where: $US_t$ is historical data at time t
  A is a base demand parameter
  $\beta$ is a base demand parameter
  $P_t$ is price at time t
  $f_t$ is a composite, time-varying demand profile In the Gaussian distribution, the historical unit sales are adjusted with an exponential distribution of price and demand profile $f_t$, which is the model for each unit period of the time series. With the demand profile $f_t$ in the exponent, the model distribution may have radical growth or decay between adjacent points in the time series. As a control mechanism, a prior probability distribution, as derived from a Bayesian framework, is added to equation (3). The prior probability distribution adds a control parameter $K(f_t-f_{t-1})^2$ to equation (3) as follows:

$$R^2(A, \beta, f_t) = \sum_t \left( \left(US_t - A_e^{-\beta P_t + f_t}\right)^2 + K(f_t - f_{t-1})^2 \right) \quad (3)$$

where: K is confidence of the prior probability distribution

The Bayesian prior probability distribution of equation (3) provides information that demand shouldn't change too quickly from time period to time period. This is a powerful form of prior. More complex priors can be created to incorporate other factors like a weekly seasonal cycle. The present time period $f_t$ is expected to be similar to the previous time period $f_{t-1}$. The prior probability distribution $K(f_t-f_{t-1})^2$ thus controls the rate of change of the likelihood function. The controlling effect tends to smooth out and stabilize the system. The control coefficient K represents confidence of the prior probability distribution and may be input through user control panel 72 as a function of the model. The value of K directly relates to confidence. As K goes to infinity, the confidence is maximum. As K goes to zero, the confidence is zero. In general, the expression for confidence K is given in equation (4) as:

$$K = \frac{1}{\sigma_f} \frac{n_i}{\sigma_{US}} \quad (4)$$

where: $\sigma_f$ is standard deviation of target f $n_i$ is average units sales $\sigma_{US}$ is standard deviation of unit sales To develop the non-stationary time series model 24, it is necessary to solve equation (3) for the values of A, $\beta$, and $f_t$. Assuming 100 time periods in the time series, the values for A, $\beta$, and $f_0$-$f_{99}$ represent 102 unknown parameters. Taking the partial derivative of $R^2$ with respect to A, $\beta$, and $f_0$-$f_{99}$, and setting each partial derivative equal to zero, provides 102 equations from which to solve for the 102 unknown parameters, see equations (5).

$$\frac{\partial R^2}{\partial A} = 0 \quad (5)$$
$$\frac{\partial R^2}{\partial \beta} = 0$$
$$\frac{\partial R^2}{\partial f_t} = 0$$

If equations (5) had been linear, then non-stationary time series model 24 solves directly for the unknown base demand parameters and time-varying demand profile parameters. In the present discussion, since equations (5) are non-linear, non-stationary time series model 24 solves for the unknown parameters through an iterative process. Assume some initial value for each unknown parameter from historical data, or best-guess scenario. The unknown values of A, $\beta$, and $f_0$-$f_{99}$ can be estimated or solved from the partial derivative equations using a variety of algorithms. For example, the equations (5) may be solved using inverse Hessian, Marquart-Levenberg, and variable matrix. In a typical matrix resolution algorithm, the number of computations needed to solve the matrix is the number of unknown parameters in the matrix ($N_P$) raised to the third power, i.e., $N_P^3$. In the present example, the traditional matrix solution may require $102^3$ floating point operations, which is fairly computational intensive, even by today's standards.

Figure 8:
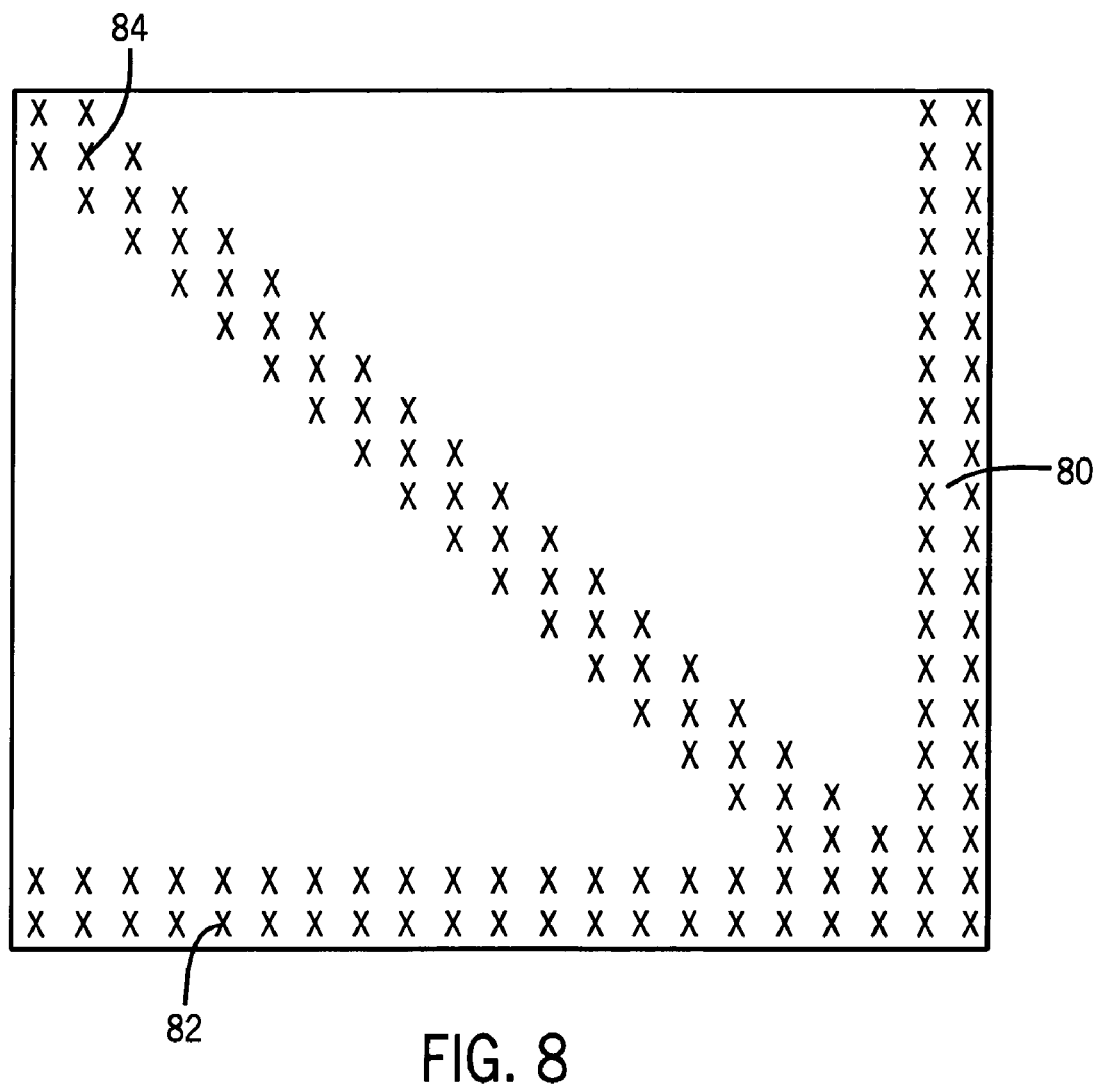
FIG. 8 illustrates a tri-diagonal band matrix.

To simplify and reduce the computational time, the inverse Hessian with tri-diagonal band matrix (TDBM), such as shown in FIG. 8, is used to resolve equations (5) because it uses certain computational efficiencies to reduce the execution time. Notably, the form of equations (5) fits nicely into the structure of the TDBM. The TDBM has 2-row horizontal and vertical bands 80 and 82 along the top or bottom and one side of the matrix, one row of each band for base demand parameters A and one row of each band for base demand parameter $\beta$. In addition, the TDBM has a 3-row diagonal band 84 intersecting the horizontal and vertical bands. The 3-row diagonal band arises from the demand profiles $f_t$ and $f_{t-1}$. The "x" entries in FIG. 8 have a numeric value; the remaining entries in the TDBM are zero. The sparsity of non-zero parameters, and the significant proportion of zero entries, in the TDBM simplifies its solution. Further detail of the TDBM structure and its solution can be found in "Numerical Recipes" by William Press, Cambridge Publisher, 1986, chapter 2, pages 64-73. The TDBM can be solved in a fraction of the time as other matrix resolution algorithms. In the present analysis using TDBM, the matrix can be solved in about $10^4$ floating point operations, which reduces the number of floating point operations required for other matrix solutions by a factor of 100.

Once the values of parameters A, $\beta$, and $f_0$-$f_{99}$ have been resolved, then the estimated values are compared to previous estimates to determine if the solution of the parameter is converging to a particular value. The level of convergence needed to fix a solution is dependent on the system being modeled and may be entered via user control panel 72. The estimation process repeats with the converged parameter(s) used in equation (3). Equation (3) is solved again using the inverse Hessian with TDBM and the new estimates for the remaining unknown parameters are again checked for convergence. The process repeats until all values for parameters A, $\beta$, and $f_0$-$f_{99}$ have converged to an identified and quantified solution, or until a maximum number of iterations is reached, in which case a notice of maximum iterations reached without resolving all parameters is reported to the user.

For purposes of the present discussion, all parameters A, $\beta$, and $f_0$-$f_{99}$ are assumed to have been resolved from the above iterative estimation process. In one solution, $\beta$=0.3 and A=500. In addition, factors $f_0$-$f_{99}$ should be constrained at the end points of the time series. In one embodiment, one end point, i.e. most recent in time, the end point should be zero. The end point of the opposite end of the time series should have a constant slope. The now solved-for parameters are stored in a table or file on hard disk 64 for use in forecasting with non-stationary time series model 24. With the known values for A, $\beta$, and $f_0$-$f_{99}$, non-stationary time series model 24 can forecast and predict units sales over the time series, given proposed sets of input data. Equation (6) provides the basic relationship of forecasted $US_t$ as a function of A, $\beta$, $P_t$, and $f_0$-$f_{99}$.

$$US_t = A_e^{-\beta P_t + f_t} \quad (6)$$

In another embodiment, the prior probability distribution can be given as reference values for demand profile $f_t$ over the time series, as seen in equation (7). The reference demand profile $f_t^{REF}$ is set for each time period and allows certain known events, such as holiday spikes, to be specified within the model. The reference demand profile $F_t^{REF}$ is set within non-stationary time series model 24, or are input by way of user control panel 72. Equation (7) is solved as described for equation (3) to ascertain unknown parameters. The forecast unit sales are then calculated as described for equation (6).

$$R^2(A, \beta, f_t) = \sum_t \left(US_t - A_e^{-\beta P_t + f_t}\right)^2 + \qquad (7)$$
$$\sum_t K\left((f_t - f_{t-1}) - (f_t^{ref} - f_{t-1}^{ref})\right)^2$$

In yet another embodiment, the prior probability distribution can be given as reference values for demand profile $f_t$ over the time series at later points in time, as seen in equation (8). The prior points in time may be t-1, t-2, through t-p, where p is any integer. The reference demand profile $f_{REF}$ is set within non-stationary time series model 24, or are input by way of user control panel 72. Equation (8) is solved as described for equation (3) to ascertain unknown parameters. The forecast unit sales are then calculated as described for equation (6).

$$R^2(A, \beta, f_t) = \sum_t \left(US_t - A_e^{-\beta P_t + f_t}\right)^2 + \qquad (8)$$
$$\sum_{t,p} K_p\left((f_t - f_{t-p}) - (f_t^{ref} - f_{t-p}^{ref})\right)^2$$

In still another embodiment, the prior probability distribution can take into account variance as a function of time, as seen in equation (9). The variance is calculated within non-stationary time series model 24 using average values, or are input by way of user control panel 72. Equation (9) is solved as described for equation (3) to ascertain unknown parameters. The solution of the time varying variance using the multi-diagonal band matrix approach will cause the number of diagonal bands to increase to say 5-6 bands. The forecast unit sales are then calculated as described for equation (6).

$$R^2(A, \beta, f_t) = \sum_t \left(US_t - A_e^{-\beta P_t + f_t}\right)^2 + \qquad (9)$$
$$\sum_t \left(\frac{(f_t - f_{t-1})^2}{2\vartheta_t^2} + \ln\vartheta_t + K_2(\vartheta_t - \vartheta_{t-1})^2\right)$$

where: $\theta_t$ is variance as a function of time

Figure 9:
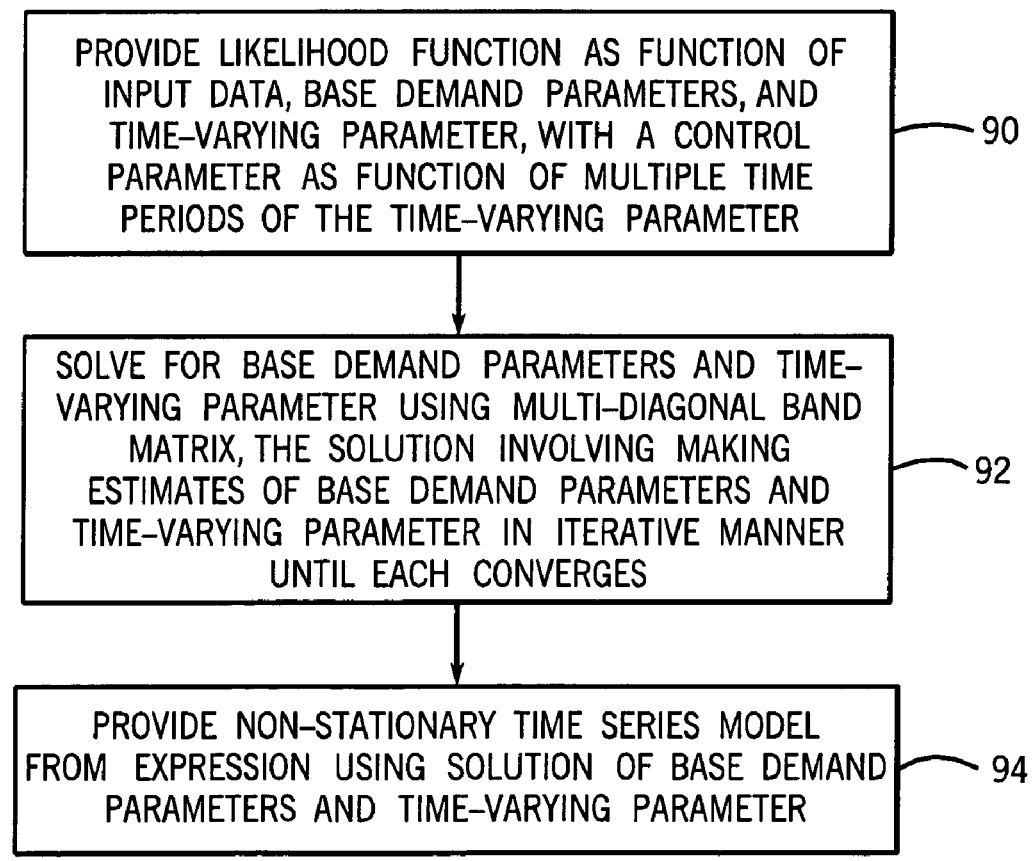
FIG. 9 illustrates the steps of providing a model using non-stationary time series data.

The process of forecasting a non-stationary time series model is shown in FIG. 9. Step 90 provides a likelihood function as a function of input data, base demand parameters, and time-varying parameter. The likelihood function uses a prior probability distribution as a control parameter of adjacent time periods of the time-varying parameter. The likelihood function takes the general form of any likelihood function, e.g., a Poisson, Gaussian, Negative Binomial, or one of many others. The Gaussian-based time series is an exponential function of the base demand parameters and the time-varying parameter. Step 92 solves for the base demand parameters and time-varying parameter using a multi-diagonal band matrix having horizontal and vertical bands for the base demand parameters and a diagonal band for the time-varying parameter. The solution of base demand parameters and time-varying parameter involves making estimates thereof in an iterative manner until the base demand parameters and time-varying parameter each converge. The time varying parameter includes product-level factors which influence a category demand function. Step 94 provides a non-stationary time series model from an expression using the solution of the base demand parameters and time-varying parameter. The non-stationary time series model is demand as a function of time.

The non-stationary time series model 24 gives retailer 20 the ability to forecast or predict economic models, given proposed sets of input data or what-ifs, which have significant impact on its business. Report 26 may include FIGS. 3-5 as part of its forecast information. In the present example, unit sales has been discussed in detail as the economic model, although the non-stationary time series model is applicable to many other economic, scientific, and commercial problems. The non-stationary time series model allows for variation of demand-influencing factors within the time series and does not require tuning for such time dependent product or SKU level demand profiles. The non-stationary time series model automatically adjusts to the variance in the time dependent parameters by modeling the behavior over each unit period of the time series. The non-stationary time series model generates accurate price elasticity data, which in turn feeds price optimization tools.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer implemented method of modeling non-stationary time series data, comprising:

collecting sales data for goods or services from a retail outlet;

transmitting the sales data to a third party through an open-architecture computer network and storing the sales data on a hard disk;

retrieving the sales data from the hard disk;

providing a likelihood function as a function of the sales data, base demand parameters for the goods or services, and time-varying demand parameter for the goods or services, wherein the likelihood function is a Gaussian-based likelihood function which includes a control parameter as a function of multiple time periods of the time-varying demand parameter for the goods or services;

solving, by a computer processor, for the base demand parameters for the goods or services and time-varying demand parameter for the goods or services using an inverse Hessian with tri-diagonal band matrix (TDBM), the inverse Hessian with TDBM having horizontal and vertical bands for the base demand parameters for the goods or services and a diagonal band for the time-varying demand parameter for the goods or services;

providing, by the computer processor, a non-stationary time series model from an expression using the solution of the base demand parameters for the goods or services and time-varying demand parameter for the goods or services, the non-stationary time series model including a reference demand profile for the goods or services incorporating known events from the retail outlet within the non-stationary time series model, the known events including holiday spikes;

transmitting the non-stationary time series model to the retail outlet through the open-architecture computer network, the non-stationary time series model being displayed via a website; and controlling, by the computer processor, operation of the retail outlet by setting a price for the goods or services based on the non-stationary time series model.

2. The computer implemented method of claim 1, wherein the control parameter is an expression of a controllable coefficient times a difference between the time-varying parameter at a first time and the time-varying parameter at a second time which is one step prior in time.

3. The computer implemented method of claim 1, wherein the time-varying parameter includes a time dependent product-level-parameter which influences category demand function.

4. The computer implemented method of claim 1, wherein the solution of base demand parameters and time-varying parameter involves making estimates thereof in an iterative manner until the base demand parameters and time-varying parameter each converge.

5. The computer implemented method of claim 1, wherein the base demand parameters and time-varying parameter are solved using a multi-diagonal band matrix.

6. The computer implemented method of claim 1, wherein the non-stationary time series model is a demand forecast as a function of time.

7. The computer implemented method of claim 1, wherein the control parameter includes reference values for the time-varying parameter over the time series.

8. The computer implemented method of claim 1, wherein the control parameter includes a control coefficient as a function of average unit sales and standard deviation of average unit sales.

9. The computer implemented method of claim 1, wherein the time-varying parameter includes variance as a function of time.

10. A method of using a non-stationary time series model, comprising:

collecting sales data for goods or services from a commercial outlet;

transmitting the sales data to a computer network;

providing a likelihood function as a function of the sales data, base demand parameter for the goods or services, and time dependent demand parameter for the goods or services;

solving, by a computer processor, for the base demand parameter for the goods or services and time dependent demand parameter for the goods or services using an inverse matrix, the inverse matrix having horizontal and vertical bands for the base demand parameters for the goods or services and a diagonal band for the time dependent demand parameter for the goods or services;

providing, by the computer processor, a non-stationary time series model from an expression using the solution of the base demand parameter for the goods or services and time dependent demand parameter for the goods or services, the non-stationary time series model including a reference demand profile for the goods or services incorporating known events from the commercial outlet within the non-stationary time series model, the known events including holiday spikes;

transmitting the non-stationary time series model to the commercial outlet through the computer network; and controlling, by the computer processor, operation of the commercial outlet by setting attributes for the goods or services based on the non-stationary time series model.

11. The method of claim 10, wherein the likelihood function includes a control parameter as a function of multiple time periods of the time dependent parameter.

12. The method of claim 11, wherein the control parameter is an expression of a control coefficient times a difference between the time dependent parameter at a first time and the time dependent parameter at a second time which is previous in time from the first time.

13. The method of claim 10, wherein the solution of base demand parameter and time dependent parameter involves making estimates thereof in an iterative manner until the base demand parameter and time dependent parameter each converge.

14. The method of claim 10, wherein the base demand parameter and time dependent parameter are solved using a multi-diagonal band matrix.

15. The method of claim 10, wherein the time dependent parameter includes variance as a function of time.

16. A program storage device readable by a machine, tangibly embodying a program of instructions executable by the machine to perform method steps for using a non-stationary time series model, the method steps comprising:

collecting sales data for goods or services from a commercial outlet;

transmitting the sales data to a computer network;

providing a likelihood function as a function of the sales data, base demand parameter for the goods or services, and time dependent demand parameter for the goods or services;

solving, by the machine, for the base demand parameter for the goods or services and time dependent demand parameter for the goods or services using an inverse matrix, the inverse matrix having horizontal and vertical bands for the base demand parameters for the goods or services and a diagonal band for the time dependent demand parameter for the goods or services;

providing, by the machine, a non-stationary time series model from an expression using the solution of the base demand parameter for the goods or services and time dependent demand parameter for the goods or services, the non-stationary time series model including a reference demand profile for the goods or services incorporating known events from the commercial outlet within the non-stationary time series model, the known events including holiday spikes;

transmitting the non-stationary time series model to the commercial outlet using the computer network; and controlling, by the machine, operation of the commercial outlet by setting attributes for the goods or services based on the non-stationary time series model.

17. The computer program product of claim 16, wherein the likelihood function is a Gaussian-based time series having an exponential function of the time dependent parameter.

18. The computer program product of claim 16, wherein the likelihood function is a Poisson or Negative Binomial-based likelihood function.

19. The computer program product of claim 16, wherein the likelihood function includes a control parameter as a function of multiple time periods of the time dependent parameter.

20. The computer program product of claim 16, wherein the control parameter is an expression of a control coefficient times a difference between the time dependent parameter at a first time and the time dependent parameter at a second time which is previous in time from the first time.

* * * * *